United States Patent Office 2,834,431
Patented May 13, 1958

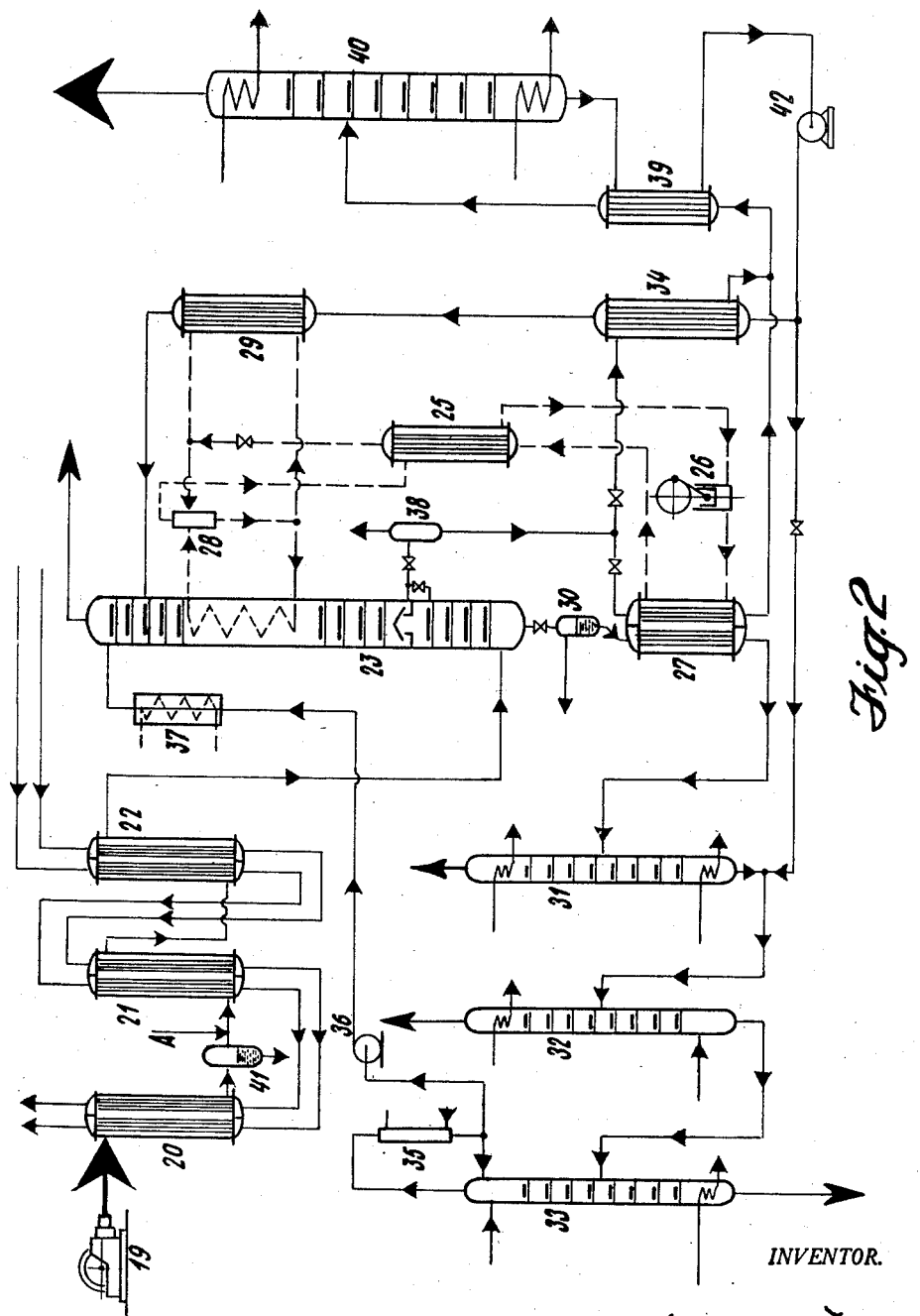

2,834,431

METHOD OF SEPARATING ACETYLENE FROM METHANE CRACKING GASES

Giacomo Fauser, Novara, Italy, assignor to Montecatini, Societa Generale per l'Industria Mineraria e Chimica, a corporation of Italy Application December 12, 1955, Serial No. 552,619

Claims priority, application Italy December 16, 1954

2 Claims. (Cl. 183—120)

The present invention relates to an improved method of separating actylene from methane cracking gases, whereby, after operating under pressure and at low temperatures, acetylene is obtained in highly pure and concentrated form.

Numerous processes have been disclosed in the past for the separation of acetylene from gaseous mixtures by extracting acetylene with various solvents such as, for example, water, liquid hydrocarbons, halogenated hydrocarbons, nitrobenzene, ketones, acetonitrile, acetaldehyde, vinyl acetate, amides of alkylated aliphatic acids, as well as liquefied gasees ($NH_3$, $SO_2$, $CO_2$, $CH_3Cl$, $C_2H_5Cl$, etc.) and others. Many of the afore-listed solvents are suitable in conjunction with certain gaseous mixtures or for special purposes but, in general, wherever a high acetylene yield and a very pure gas is required and where gaseous mixtures low in acetylene (such as, for example, gaseous mixtures obtained from methane cracking by partial combustion) must be treated, solvents such as acetone and acetaldehyde are preferred because they approach most closely the "ideal solvent" for the recovery of acetylene, which ideal solvent, generally speaking, must have the following properties:

(1) The solvent must have a high dissolving rate for acetylene while having, at the same time, a low dissolving rate for all other gases.

(2) The solvent must have a high boiling point and a low vapor pressure at normal temperatures.

(3) The solvent must have a low viscosity so that the packing material of an absorption column is most effectively wetted therewith.

(4) The solvent must be stable at the boiling point.

(5) The solvent must not react with acetylene or other gases such as methane, olefines, etc.

According to one prior process for the purification of methane cracking gases a limited amount of acetone as the solvent is first used in a pre-scrubbing operation at low temperatures (—20° C.) in order to separate a higher homologue (diacetylene) from acetylene, followed by a scrubbing operation, at temperatures just slightly below 0° C., with a larger amount of the solvent which then absorbs all of the acetylene. According to this disclosure (U. S. Patent No. 1,989,273), the solvent is then regenerated at normal temperature and is recycled, but the means best suitable to perform the recycling process are not indicated, and nearly all of the acetylene is recovered by heating the solution to room temperature while the acetylene and diacetylene absorbed in the first operation step are liberated by extracting the solvent at reduced pressures or by passing nitrogen gas through the solution. According to the afore-mentioned patent, other solvents besides ketones, such as vinyl acetate, acetaldehyde, etc. or mixtures thereof can be used in conjunction with the process. Moreover, in order to dissolve the diacetylene, it is suggested to operate at temperatures between —30 to —40° C. but to scrub the solution which has been freed from diacetylene at a still lower temperature, for example at —80° C., without employing any pressure.

According to another process (U. S. Patent No. 1,942,131), the gases obtained upon cracking methane in an electric arc are cooled to a very low temperature by means of passing them through a refrigerating cycle and are then scrubbed in countercurrent with a solvent (acetone or acetone-ethanol) at —81.5° C. and 1.3 atm. The cold solution is subsequently decompressed to liberate the dissolved inert gases and is entered at the top of a plate degassing column. Acetone is liberated at the top of the column while at the bottom of the column gases rich in acetylene and diacetylene, respectively, are withdrawn at increasing temperatures. However, according to this process, the solvent soon becomes unserviceable due to the formation of ice and due to the freezing of other materials contained in the gaseous mixture. Therefore the latter must be carefully dried and purified by means of alkaline-earth metal carbides, prior to the separation step. Finally, according to this process, the separation of the acetylene homologues from acetylene takes place in the degassing tower.

In general, the processes in which ketones are used as solvents at very low temperatures (for example, —50° C.) are impaired by the formation of ice in the heat exchangers (from the moisture of the starting gases), which fact requires twice the number of necessary exchangers be employed in order to operate them alternately. For this reason, in one of the processes the entire moisture is first condensed in a 8–9% aqueous solution of acetone at from 0 to —40° C. The gaseous mixture, comprising the acetylene, is then treated with acetone at still lower temperatures (without pressure) whereby the $C_2H_2$ dissolves and thus can be separated from the other gases.

I have now found that it is possible to use acetaldehyde as a selective solvent for acetylene contained, for example, in amounts of the order of 8 to 10%, in a gaseous mixture obtained upon cracking methane (for example by a partial combustion of methane), by means of operating under pressure and at very low temperatures in an operating cycle which permits the recovery of acetylene at a very high concentration (up to 99%) and at very high purity without encountering the aforementioned disadvantages.

The novel features which I consider characteristic of my invention are set forth with particularity in the appended claims. The invention itself, however, and any additional objects and advantages thereof will best be understood from the following description of a preferred embodiment when read in connection with the accompany drawings in which:

Fig. 2 is a flow diagram.

Figure 1:
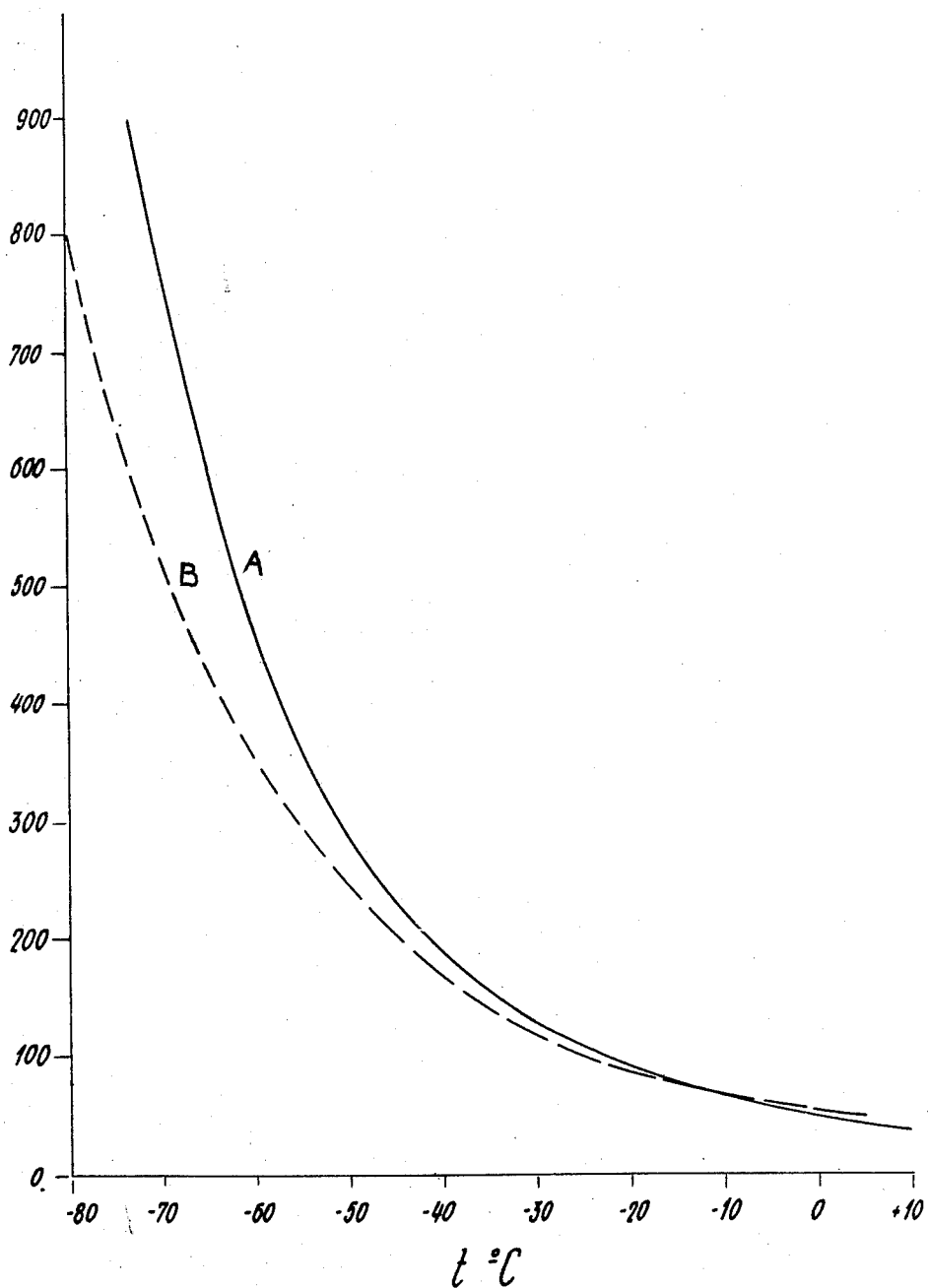
Fig. 1 is a solubility graph.

The present invention is based in part on the unexpected discovery that the solubility of acetylene in acetaldehyde which, at temperatures down to about —15° C. is lower than the solubility in acetone, becomes considerably higher at temperatures below —15° C. without encountering any difficulties. Referring particularly to the solubility graph of Fig. 1, wherein the full line (A) represents the solubility of acetylene in acetaldehyde and the dotted line (B) represents the solubility in acetone and wherein the abscissa indicates the temperature in ° C. and the ordinate the solubilities in N ccm./volume unit. As indicated, for example, in the graph, at —70° C. and 760 mm. Hg the solubility of acetylene is as follows:

In acetone_____about 530 N vol./vol. unit
In acetaldehyde_____about 760 N vol./vol. unit Obviously, when operating under pressures higher than atmospheric pressures, the solubilities will follow Henry's law.

Referring now particularly to Fig. 2, the gaseous mixture obtained, for example, from cracking methane by a partial combustion, is compressed to 13 atm. in a compressor 19 and enters from there into a heat exchanger 20 in countercurrent with inert gases liberated during the selective absorption of acetylene that are subsequently fractionated into two mixtures, $H_2+CO$ and $CH_4+C_2H_4$, by means of a so-called cold rectification including a so-called Linde cycle (cooling by means of decompression) not shown in the diagram. During this heat exchange, condensation of the moisture and of the condensable vapors takes place, which are withdrawn by means of separator 41.

In countercurrent with these liberated, cold, inert gases and after addition of acetaldehyde, the gases are further cooled by means of heat exchangers 21 and 22, to a temperature near but slightly higher than the freezing point of acetylene, preferably to a temperature of the order of $-80°$ C. The gases cooled in this manner enter at the bottom of a plate scrubbing and absorption column 23, where they rise in countercurrent with further acetaldehyde which has also been cooled to a temperature ranging from $-80$ to $-85°$ C. The absorption takes place in two stages:

(a) In the lower section (¼) of column 23, wherein the gases are brought in contact with a limited amount of solvent which is already rich in $C_2H_2$ and dissolves selectively the higher acetylene and additional $C_2H_2$.

(b) In the upper section (¾) of column 23, at a temperature near but slightly higher than the freezing temperature of acetylene and at the initial pressure (for example, 13 atm.) where they are brought in contact with a larger amount of solvent than at the first stage. Here the solvent absorbs acetylene and carbon dioxide completely from the gas.

Gas, scrubbed in this manner, emerges at the top of the absorption column and is fractionated into its components by cooling according to the known Linde technique. If the gas is intended for methanol synthesis, the fractions obtained are:

(1) A $CO+H_2$ fraction, containing at most 0.25% of $CH_4$. This fraction can be used directly for methanol synthesis.

(2) A $CH_4$ fraction which can be recycled to the initial cracking process.

(3) A $C_2H_4$ fraction which is separated from the preceding fraction wherever ethylene as such is used. Otherwise this fraction is sent back to the cracking step together with the preceding fraction.

On the other hand, if the gas is intended for ammonia synthesis, the carbon monoxide is separated from hydrogen by scrubbing with liquid nitrogen. In this manner, the following two fractions are obtained: An $H_2$ fraction which is sent directly to the ammonia synthesis and a CO fraction which may be either recycled to the conversion stage or be used as such.

The low temperature within the absorption column 23 is maintained by means of an ethylene refrigerating cycle 34—25—26—27—28 and 29. From the two absorption stages, two different aliquots of gas solution are obtained which are treated separately, the first in a cycle including the elements 30, 27, 31, 32 and 33; and the other in a cycle including the elements 38, 34, 39 and 40.

Describing this part of the process in greater detail, the solution obtained in the first stage and emerging from the bottom of column 23 which contains $C_2H_4$, $H_2$, CO, $CO_2$ and $N_2$, plus the residual moisture of the raw gases which has escaped condensation during the initial cooling at 20, is released of its pressure in expander 30 wherein degassing of the inerts, primarily hydrogen (but also some CO, $CH_4$ and $N_2$) takes place. After the solution has been brought to a higher temperature in heat exchanger 27, it is entered at the center section of a plate fractionating column 31, designed to reflux all of the liquid in being heated at the bottom by a steam coil and cooled at the top by an ammonia dephlegmator. At the top of the column, dissolved acetylene and carbon dioxide are liberated and recycled to the compressor 19 in order to mix with new gaseous mixture. From the bottom of column 31, a solution of higher acetylene is withdrawn which then, mixed with an aliquot of solvent coming from column 40 and heat exchanger 39 and propelled by the pump 42, passes into the middle section of a plate degassing column 32 which is also operated on the principle of refluxing all of the liquid and in having an ammonia dephlegmator at the top. Column 32 is not heated and degassing is obtained by blowing an inert gas such as, for example, methane into the bottom of the column if the higher acetylenes are to be sent back to the cracking step or, for example, nitrogen if these higher acetylenes are to be subsequently used as such.

(1) The larger part of the higher acetylenes emerges from the top of column 32 together with the inert gas while a solution of the smaller part of higher acetylenes leaves the column at the bottom. This liquid is distilled by partially refluxing in a plate column 33 which is heated by a steam coil at the bottom. The moisture previously absorbed by the solvent in the lower section of column 23 leaves the lower section of column 33 together with the smaller part of the higher acetylenes, while the rectified solvent is withdrawn from the upper section of column 33 in order to be cooled with water at the condenser 35 and to be recompressed to 13 atm. by means of the compressor 36. The cooled solvent is then passed to the ethylene cooler 37 wherein the temperature thereof can be lowered to $-90°$ C. in order to pass it at a temperature of $-85°$ C., into the top section of the absorption column 23. The aliquot of solvent distilled in column 23 is such that a minimum water content of about 0.5% is continuously maintained in the solvent during the absorption step in column 23.

(2) The solution of acetylene and carbon dioxide obtained during the second stage and emerging at the base of the upper section of the absorption column 23 is decompressed in a separator 38 whereby the less soluble gases ($H_2$ and CO) are liberated. These gases are recovered together with the inert gases. From the separator 38 the liquid is passed on to heat exchangers 27, 34 and 39 in order to increase the temperature. The liquid is then entered at a point about ¾ of the height into the plate degassing column 40 operating on the principle of refluxing all of the liquid and heated at the bottom with ammonia to a temperature of $+30°$ C. and cooled at the top by means of an ammonia dephlegmator.

The solvent emerging from the bottom of column 40 passes through a heat exchanger 39 where it is cooled in countercurrent with the solution which enters into the degassing column 40. At 42 the solvent is recompressed and further cooled in the heat exchanger 34 and subsequently in the heat exchanger 29 of the ethylene cycle 25, 26, 27, 28 and 29 so that it finally passes at a temperature of $-80°$ C. into the absorption column 23 at the top thereof.

From the upper section of column 40 acetylene and carbon dioxide are simultaneously withdrawn. It is readily possible to separate the carbon dioxide from the mixture by means of chemical absorptions not shown in the diagram, such as by means of absorption in an alkaline solution or in ethanolamine, etc., from which the carbon dioxide can be recovered by regenerating the alkaline solution. This highly concentrated carbon dioxide can be used, for example, for the synthesis of urea.

After this separation by scrubbing and after condensation of entrained solvent, acetylene of a very high concentration (about 99%) is finally obtained which is sufficient for most practical applications.

I claim:

1. A process for the separation and recovery of the constituents of a gaseous mixture obtained from a partial combustion of methane whereby the acetylene and carbon dioxide constituents of the mixture are recovered substantially pure, said process comprising compressing the gaseous mixture to about 13 atm., cooling to a temperature of the order of —80° C. in a multiple stage operation including the removal of condensed moisture and the addition of a first portion acetaldehyde as selective solvent, subjecting a rising flow of said admixture to a scrubbing and absorbing action of a countercurrently applied second portion of said solvent which, already rich in acetylene, selectively absorbs higher acetylenes and additional acetylene, subjecting the rising vapors to a scrubbing and absorbing action of a countercurrently applied third and larger portion of said solvent which has been cooled to a temperature slightly above the freezing point of acetylene and which completely absorbs the remaining acetylene and the carbon dioxide of said gaseous mixture, separating the scrubbed gaseous mixture into a carbon monoxide and hydrogen fraction, a methane fraction which is recycled for combustion, and an ethylene fraction, liberating countercurrently applied second solvent portion of hydrogen, carbon monoxide, methane and nitrogen by degassing through pressure release and recovering acetylene and carbon dioxide by heating and refluxing said second solvent portion, liberating said countercurrently applied third solvent portion of the less soluble gases hydrogen and carbon monoxide as well as of inert gas by degassing through pressure release, recovering the main portion of acetylene and carbon dioxide by heating to about 30° C. and refluxing said third solvent portion, separating the carbon dioxide from acetylene, partly cooling said third solvent portion after having been freed of hydrogen, carbon monoxide, acetylene and carbon dioxide in a heat exchange with parts of said third solvent portion which have not been heated and refluxed as yet, compressing to the initial pressure of about 13 atm., cooling one part of the compressed solvent to a temperature of the order of —80° C., adding said cooled and compressed solvent as part of said countercurrently applied third solvent portion, combining the balance of said partly cooled and compressed solvent with said heated second solvent portion, liberating this combined fraction of most of the higher acetylenes by means of passing methane through said combined fraction and subjecting the gaseous discharge to cracking and recycling, heating the remaining solvent while partially refluxing, condensing rectified solvent vapors in heat exchange with water, compressing to about 13 atm., cooling to about —90° C. and using said compressed solvent at about —85° C. as said countercurrently applied third solvent portion.

2. A process for separation and recovery of the constituents of a gaseous mixture obtained from a partial combustion of methane whereby the acetylene and carbon dioxide constituents of the mixture are recovered substantially pure, said process comprising compressing the gaseous mixture to about 13 atm., cooling to a temperature of the order of —80° C. in a multiple stage operation including the removal of condensed moisture and the addition of a first portion of acetaldehyde as selective solvent, subjecting a rising flow of said admixture to a scrubbing and absorbing action of a countercurrently applied second portion of said solvent which, already rich in acetylene, selectively absorbs higher acetylenes and additional acetylene, subjecting the rising vapors to a scrubbing and absorbing action of a countercurrently applied third and larger portion of said solvent which has been cooled to a temperature slightly above the freezing point of acetylene and which completely absorbs the remaining acetylene and the carbon dioxide of said gaseous mixture, separating the scrubbed gaseous mixture into a carbon monoxide and hydrogen fraction, a methane fraction which is recycled for combustion, and an ethylene fraction, separating the carbon monoxide and hydrogen fraction by scrubbing with liquid nitrogen, liberating said countercurrently applied second solvent portion of hydrogen, carbon monoxide, methane and nitrogen by degassing through pressure release and recovering acetylene and carbon dioxide by heating and refluxing said second solvent portion, liberating said countercurrently applied third solvent portion of the less soluble gases hydrogen and carbon monoxide as well as of inert gas by degassing through pressure release, recovering the main portion of acetylene and carbon dioxide by heating to about 30° C. and refluxing said third solvent portion, separating the carbon dioxide from acetylene, partly cooling said third solvent portion after having been freed of hydrogen, carbon monoxide, acetylene and carbon dioxide in a heat exchange with parts of said third solvent portion which have not been heated and refluxed as yet, compressing to the initial pressure of about 13 atm., cooling one part of the compressed solvent to a temperature of the order of —80° C., adding said cooled and compressed solvent as part of said countercurrently applied third solvent portion, combining the balance of said partly cooled and compressed solvent with said heated second solvent portion, liberating this combined fraction of most of the higher acetylenes by means of passing nitrogen through said combined fractions and separating the gaseous discharge, heating the remaining solvent while partially refluxing, condensing rectified solvent vapors in heat exchange with water, compressing to about 13 atm., cooling to about —90° C. and using said compressed solvent at about —85° C. as said countercurrently applied third solvent portion.

References Cited in the file of this patent

UNITED STATES PATENTS

| | | |
|---|---|---|
| 1,942,131 | Baumann et al. | Jan. 2, 1934 |
| 1,989,273 | Grimme et al. | Jan. 29, 1935 |